(12) United States Patent
Do et al.

(10) Patent No.: US 8,429,015 B2
(45) Date of Patent: Apr. 23, 2013

(54) METHOD AND APPARATUS FOR VARYING THE AMOUNT OF ADVERTISING CONTENT

(75) Inventors: Phuc Ky Do, Morrisville, NC (US); Justin Monroe Pierce, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1704 days.

(21) Appl. No.: 11/565,040

(22) Filed: Nov. 30, 2006

(65) Prior Publication Data

US 2008/0133340 A1 Jun. 5, 2008

(51) Int. Cl.
*G06Q 30/00* (2012.01)

(52) U.S. Cl.
USPC .................. 705/14.55; 705/14.61; 705/14.68

(58) Field of Classification Search .................. 705/1–28
See application file for complete search history.

(56) References Cited

U.S. PATENT DOCUMENTS

2003/0149618 A1* 8/2003 Sender et al. .................. 705/14

* cited by examiner

*Primary Examiner* — Eric W Stamber
*Assistant Examiner* — William A Brandenburg
(74) *Attorney, Agent, or Firm* — Yee & Associates, P.C.

(57) ABSTRACT

The illustrative embodiments provide a computer implemented method, an apparatus, and a computer usable program product for varying the amount of received advertising content. A content editor provides a portion of a plurality of levels of advertising to a user, wherein the portion of the plurality of levels indicates an amount of advertising content to be received by the user. Responsive to receiving a user input selecting the portion of the plurality of levels, the content editor inserts the amount of advertising content into a media content to form a modified media content, wherein the amount of advertising content corresponds to the portion of the plurality of levels selected by the user. The content editor then transmits the modified media content to the user.

16 Claims, 4 Drawing Sheets

| USER IDENTIFICATION | SELECTED PORTION | MEDIA CONTENT # | ADVERTISEMENT CONTENT IDENTIFICATION | INSERTION INSTRUCTION |
|---|---|---|---|---|
| AAA | MIN | 10 | A1 | 1 AT BEGINNING |
| | MED | 5 | A1, B8, T9 | 1 AT BEGINNING, MIDDLE, AND END |
| | MAX | 4 | A1, B8, C7, T9, W4, Z10 | 2 AT BEGINNING, MIDDLE, AND END |
| HHH | MIN | 4 | A1 | 1 AT MIDDLE |
| | MIN | 6 | A1 | 1 AT MIDDLE |
| | MIN | 8 | A1 | 1 AT MIDDLE |
| | MAX | 5 | A1, B8, C7, T9, W4, Z10 | ALL IN MIDDLE |
| SSS | MED | 4 | A1, B8, T9 | ALL AT BEGINNING |
| | MED | 10 | A1, B8, T9 | ALL AT END |

*FIG. 5*

METHOD AND APPARATUS FOR VARYING THE AMOUNT OF ADVERTISING CONTENT

BACKGROUND OF THE INVENTION

1. Field of the Invention

The present invention relates generally to an improved data processing system and in particular to an advertising management system. Still more particularly, the present invention relates to a computer implemented method, apparatus, and computer usable program product for varying the amount of received advertising content.

2. Description of the Related Art

Currently, a person views and listens to advertisements whenever the person watches a television, listens to a radio, or surfs on the internet. At times, the advertisements are so pervasive that a person may lose interest in the show, song, or website which the person is listening to or viewing. As a result, to eliminate the disruptions, a person is willing to pay a premium or to consider paying a premium to enhance the viewability or listenability of the program and to eliminate or reduce the number of advertisements.

Currently, a person has the option of virtually eliminating advertisements while viewing a particular website. Typically, a person views content along with advertisements on a website for free. To virtually eliminate the advertisements, the person has the option of paying a fee for accessing the website and only viewing content on the particular website. However, this present solution only provides two pricing options for controlling the amount of received advertisements: no advertisements at full cost or all the advertisements at no cost. The current solution does not allow a person to select an in-between option or even a percentage of reduction in the amount of advertisements. Additionally, the present solution is limited to the internet and does not apply to media broadcast providers, such as television or radio stations.

BRIEF SUMMARY OF THE INVENTION

The illustrative embodiments provide a computer implemented method, an apparatus, and a computer usable program product for varying the amount of received advertising content. A content editor provides a portion of a plurality of levels of advertising to a user, wherein the portion of the plurality of levels indicates an amount of advertising content to be received by the user. Responsive to receiving a user input selecting the portion of the plurality of levels, the content editor inserts the amount of advertising content into a media content to form a modified media content, wherein the amount of advertising content corresponds to the portion of the plurality of levels selected by the user. The content editor then transmits the modified media content to the user.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
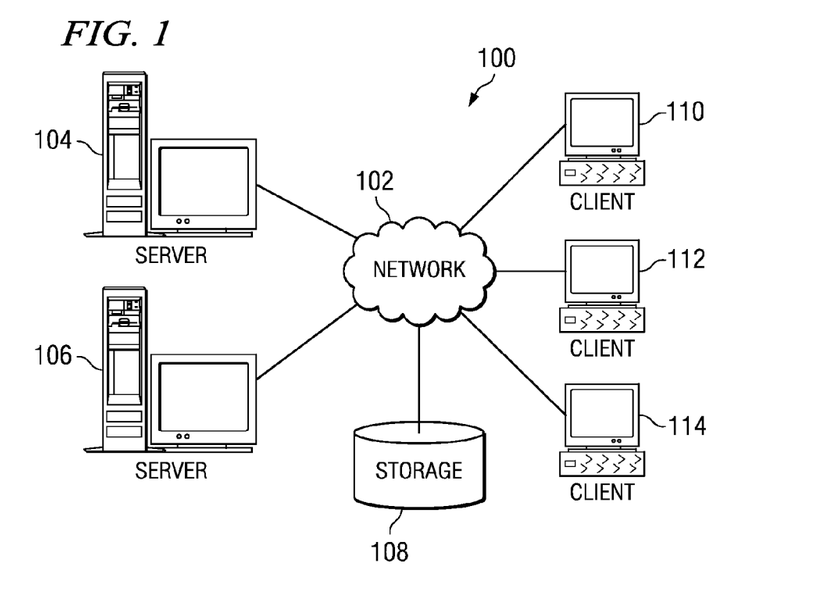
FIG. 1 is a pictorial representation of a network of data processing systems, in which illustrative embodiments may be implemented.
Figure 2:
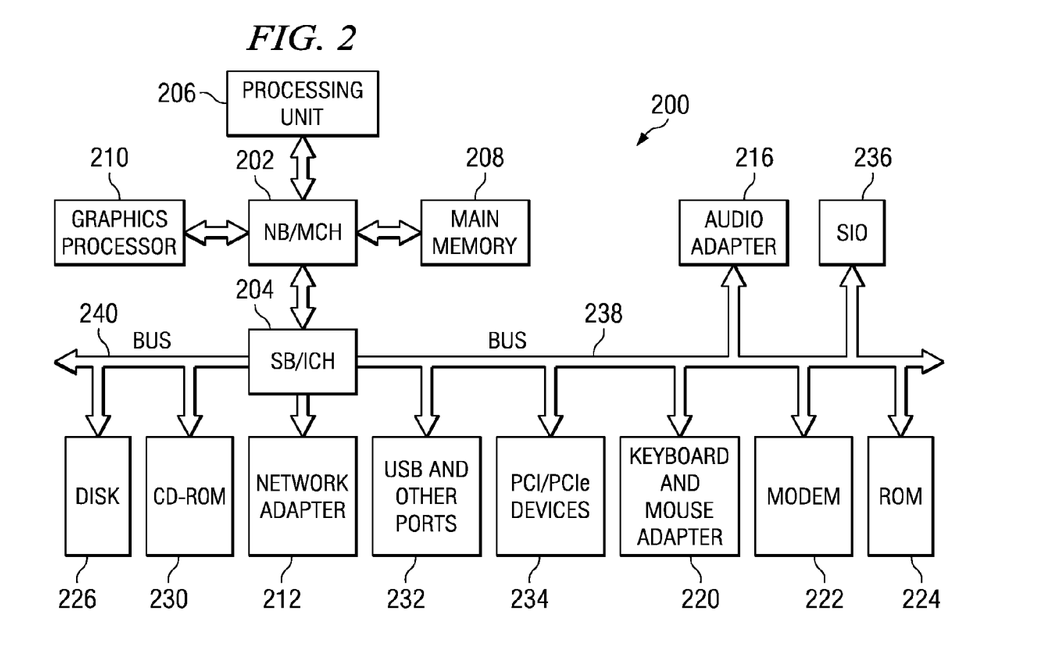
FIG. 2 is a block diagram of a data processing system, in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications, to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. (Microsoft and Windows are trademarks of Microsoft Corporation in the United States, other countries, or both.) An object oriented programming system, such as the Java™ programming system, may run in conjunction with the operating system and provides calls to the operating system from Java programs or applications executing on data processing system 200. (Java and all Java-based trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, an apparatus, and a computer usable program product for varying the amount of advertising content broadcast to a user in exchange for varying the cost incurred by the user. A content editor provides a portion of a plurality of levels of advertising to a user. The portion indicates an amount of advertising content to be received by the user. A price is associated with the portion of the plurality of levels. The price varies with the portion, and the price is presented to the user as the user selects the portion of the plurality of levels.

A user can select the portion of the plurality of levels using a graphical control displayed on a user interface. The graphical control can be at least one of a dial, a slider, a list, a scale, and a thermometer. The user can select the portion prior to or as the media content is being presented to the user. In response to the user selecting the portion of the plurality of levels, the content editor inserts the amount of advertising content into a media content to form a modified media content. The amount of advertising content inserted corresponds to the portion of the plurality of levels selected by the user. The content editor then transmits the modified media content to the user.

A media content provider provides the plurality of levels. The media content provider can be a broadcast media provider, such as a television or radio broadcast provider. The media content provider can also be an internet-based media provider, such as a website.

Figure 3:
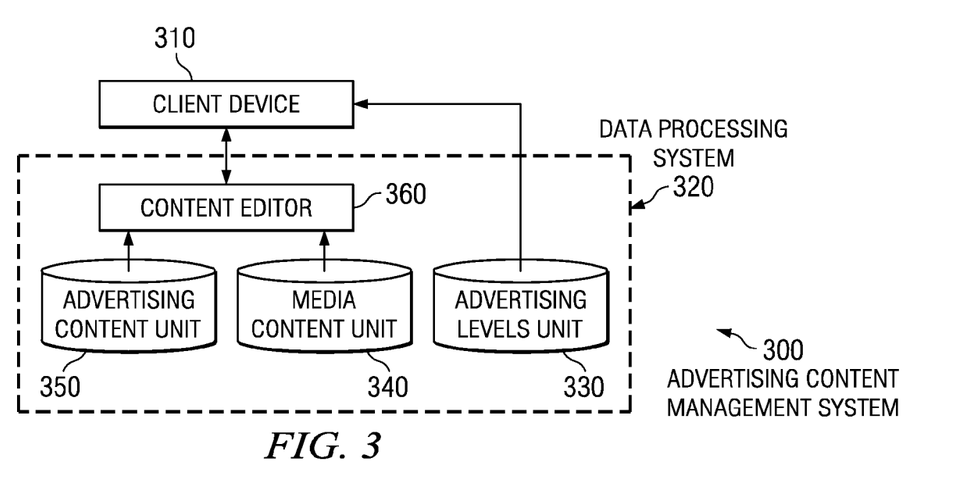
FIG. 3 illustrates an advertising content management system, in accordance with an illustrative embodiment.

FIG. 3 illustrates an advertising content management system, in accordance with an illustrative embodiment. Advertising content management system 300 can be implemented using network data processing system 100 of FIG. 1 and includes client device 310 and data processing system 320.

Client device 310 is a device that interacts with data processing system 320. Client device 310 is any device that can receive media content. Thus, in one embodiment, client device 310 can be a computer, similar to clients 110, 112, or 114 of FIG. 1 or data processing system 200 of FIG. 2. In other embodiments, client device 310 can also be a television set, an AM/FM radio, a satellite radio, or a digital television radio. In yet another embodiment, client device 310 can be a computer connected to another unit similar to client device 310, such as a television set, an AM/FM radio, a satellite radio, or a digital television radio. In the illustrative embodiment, client device 310 is a computer.

In the illustrative embodiment, client device 310 connects to a network (not shown), similar to network 102 of FIG. 1. Thus, client device 310 does not connect directly to data processing system 320, but connects via the network. However, the illustrative embodiment is not limited to the described example. Therefore, in another embodiment, client device 310 can connect directly to data processing system 320 without connecting via a network.

Data processing system 320 is a server, similar to servers 104 and 106 of FIG. 1 and data processing system 200 of FIG. 2. Data processing system 320 connects to client device 310 and includes advertising levels unit 330, media content unit 340, advertising content unit 350, and content editor 360.

Advertising levels unit 330 connects to client device 310. Advertising levels unit 330 is a storage device that stores the different advertisement content levels and the associated price for each level or portion of advertising levels offered by a particular provider of media content. Advertising levels unit 330 can be implemented in a storage unit, similar to storage 108 of FIG. 1. Advertising levels unit 330 can also be stored in the main memory, such as main memory 208 of FIG. 2, or hard disk drive, such as disk 226 of FIG. 2, of data processing system 320. Advertising levels unit 330 can store the advertisement content levels in any form, including but not limited to a table, a flat file, an Extensible Markup Language (XML) file, a relational database management system, or any combination thereof. In the illustrative embodiment, advertising levels unit 330 is a hard disk drive in data processing system 320 and stores data in a table.

In the illustrative embodiment, the provider of media content specifies the amount of advertising content associated with a particular portion of advertising content. Each portion can include one or more levels. The levels range anywhere from no advertising content to maximum advertising content. A business entity is not limited to having an option with no advertising content. A business entity can set a minimum advertising content level at any number above zero. Additionally, a business entity can define the maximum advertising content level at any number above zero, but, in practice, the maximum level will probably be the normal, unfiltered amount of advertising content typically present within one program.

In one embodiment, each level is based on a set number of advertisements across a set period of time. For example, a provider can set a minimum advertising content level of one advertisement every fifteen minutes, a medium advertising level of one advertisement every seven minutes, and a maximum advertising content level of one advertisement every thirty seconds.

However, in another embodiment, the provider can base each level on a set number of advertisements within a media segment. A media segment is a single unit or single program of a particular media item. For example, a media segment can be a single instance of a browser, a single website, a single television show, or even a single song played on a radio. Thus, for example, if a provider is a provider for television media content, the provider can base each level on the number of advertisements per television show. Accordingly, for example, the minimum advertising content level can be five (5) advertisements during a single show, and a maximum advertising content level can be twenty-five (25) advertisements during a single show.

Alternatively, in yet another embodiment, a provider can base the levels on the number of advertisement blocks that will be shown. For example, the minimum advertising content level can have five (5) advertisements shown all at one time or in a single block. On the other hand, the maximum advertising content level can be twenty-five (25) advertisements dispersed into four (4) blocks throughout the media segment. In other words, four (4) different advertisement periods will occur during a media segment, and a total of twenty-five (25) advertisements will be shown within the four (4) advertisement periods. In one embodiment, the number of advertisements per period is the same, while, in another embodiment, the number of advertisements per period varies.

In yet another embodiment, a provider can base the levels on the amount and location of visual space or "real estate" that the advertisement occupies. For example, consider an advertisement space that occupies one-quarter of a display, while another advertisement space occupies one-tenth of a display. A maximum advertising content level can be designated for the advertisement space that occupies one-quarter of the display, while a minimum advertising content level can be designated for the advertisement space that occupies one-tenth of the display screen. In this embodiment as well, the amount of advertising can be a total space versus a single section of visual space. In other words, for example, four advertisements located in three different sections on a display can occupy a total of one-tenth of the display screen, versus one advertisement in one location that occupies one-tenth of the display screen. This embodiment applies to both streaming video and non-streaming video advertisements.

In still yet another embodiment, a provider can base the levels on the presentation level of the advertisement. For example, pop-up advertisements may have a maximum advertisement content level, because pop-up advertisements grab a user's attention quickly. An advertisement that flashes can be at a medium advertisement content level, and an advertisement that does not have any flashing features can be at a minimum content level.

The illustrative embodiments are not limited to the described levels. For example, instead of a specific number of advertisements per advertisement content level, each level can be defined as a range of advertisement content amounts. For example, the minimum advertisement range can be zero to three advertisements, while the maximum advertisement range can be twenty-five to thirty advertisements. Additionally, any number of levels can exist between the minimum and maximum levels. Furthermore, a business entity can also organize the amount of advertisement content in another format, such as representing the amount of advertisement in percentages rather than numbers. For example, a business entity can have 0%, 33%, 50%, and 100% advertisement content levels. The percentages represent a percentage of the total possible amount of advertisement content over a period of time. Thus, 100% indicates a level in which all advertisement content will be shown. Fifty percent (50%) is a level in which only half of the total amount of advertisement content is to be shown. Thirty-three percent (33%) has only one-third of the total amount of advertisement content, and zero percent (0%) is none of the advertisement content.

The illustrative embodiments are not limited to the described advertisement content levels. The different levels can be implemented individually or in combination. Furthermore, one of ordinary skill in the art can implement a number of other advertisement content level combinations without deviating from the scope of the illustrative embodiments.

In use, in the illustrative embodiment, a user selects a portion of the offered advertisement content levels using client device 310. The portions can be presented as a user preference, a drop down menu, or another separate graphical user interface in a browser instance. In one embodiment, the selected portion applies to all programs at all times. In another embodiment, the portions change with the programming. In other words, a user has the option of selecting a different portion of advertising content for various media segments, for certain hours in a day, or for certain days. For example, a user can select a minimum portion for the hours between 7:00 p.m. and 10:00 p.m. every day, a medium portion between 12:00 a.m. and 8:00 a.m. and between 10:00 p.m. and 12:00 a.m. every day, and a maximum portion for the hours between 8:00 a.m. and 7:00 p.m. every day. In another example, a user can select a medium portion for a program beginning at 7:00 p.m. every day, and then change the advertisement content level for the next program beginning at 7:30 p.m. In yet another example, a user can select a minimum portion when using a particular website or Universal Resource Locator (URL), and select a maximum portion for all other websites or URLs.

The user can also select the portion at any time. In one embodiment, the user selects the portion of advertising content prior to the presentation of a media segment. In another embodiment, the user dynamically selects the portion while the media segment is being presented to the user. Dynamically, as used herein, is any time from when the media segment begins to when the media segment ends. In this embodiment, content editor 360 implements the selected portion immediately upon receipt of the command to change the portion of advertising content. Content editor 360 prorates the advertising content based on the amount of time remaining within the media segment. Thus, for example, if 60% of a media segment still remains, then content editor 360 calculates the selected portion of advertising content for the remaining 60% of the media segment.

Media content unit 340 is a storage device that stores media content. Media content unit 340 can be implemented in a storage unit, similar to storage 108 of FIG. 1. Media content unit 340 can also be stored in the main memory, such as main memory 208 of FIG. 2, or hard disk drive, such as disk 226 of FIG. 2, of data processing system 320. Media content unit 340 can store media content in a file, a database, or any other means commonly known in the art. In the illustrative embodiment, media content unit 340 is a hard disk drive.

Media content is information used to visually or audibly entertain or inform a user. Media content is separated and identified as a program, such as a television show, a movie, a radio song, or a website. Typical channels for conveying media content are broadcast media units, such as radio stations, television stations, television networks, and internet-based media units, such as World Wide Web pages and web blogs. Users view or listen to media content using a variety of devices, including, but not limited to, a television set, an AM/FM radio, a satellite radio, a computer, or a digital television radio.

In the illustrative embodiment, advertising content unit 350 is a storage device that stores advertising content. Advertising content unit 350 can be implemented in a storage unit, similar to storage 108 of FIG. 1. Advertising content unit 350 can also be stored in the main memory, such as main memory 208 of FIG. 2, or a hard disk drive, such as disk 226 of FIG. 2, of data processing system 320. Advertising content unit 350 can store advertising content in a file, a database, or any other means commonly known in the art.

In another embodiment, advertising content unit 350 can be implemented as a processing unit, similar to processing unit 206 of FIG. 2, and can execute instructions for dynamically retrieving advertising content from the business entity itself. Thus, instead of storing the advertisements, advertising content unit 350 dynamically downloads the advertising content and presents the advertising content as a user views or listens to the program.

Advertising content unit 350 stores advertisements from various business entities. In the illustrative embodiment, the advertising content is inserted into a program based on a level selected by a user. As a result, in one embodiment, the provider of media content can determine which advertisements to include in a particular media segment. In one embodiment, the determination for which advertisements are included can be based on the status of a particular business entity. The status of the business entity can include a number of factors, including but not limited to the amount of money a business entity paid for an advertisement, the number of advertisements the business entity is requesting, the length of the relationship between the provider of the media content and the business entity, or the length of the advertisement. More than one factor can be used to determine the status of the business entity. In another embodiment, the determination of which advertisements are included is based on the time of day the media segment is shown or heard. In another embodiment, the determination is based on the type of media segment being shown or heard. In yet another embodiment, the determination is based on the profile of the user. For example, the profile of the user may include the age, gender, race, marital status, and family status of the user.

A provider of media content can price advertisement spots based on the portions as well. In the illustrative embodiment, consider a provider that offers to a user minimum, medium, and maximum portions of advertising content. The minimum portion is offered to a customer at the highest cost, but only presents one advertisement for each website viewed by the user. The medium portion presents five advertisements for each website at a medium cost, while the maximum portion presents fifteen advertisements for each website at the lowest cost.

The provider can also price advertisement spots to a business entity based on in which portion the business entity selects to place an advertisement. For example, the price for displaying an advertisement for users selecting the minimum portion would be the highest, while the price for displaying an advertisement for users selecting the maximum portion would be the lowest. The illustrative embodiment is not limited to the described examples. Other advertising and pricing models and combinations can also be employed without deviating from the scope of the illustrative embodiments.

Content editor 360 combines the media content and advertising content based on the portion selected by a user. The combined media content and advertising content forms a modified media content. Depending on implementation, content editor 360 can be implemented in data processing system 320 or client device 310. In the illustrative embodiment, content editor 360 is implemented in data processing system 320 in the processing unit, similar to processing unit 206 of data processing system 200 of FIG. 2. Content editor 360 organizes the media content and advertising content using any format, including but not limited to a table, a flat file, an Extensible Markup Language (XML) file, a relational database management system, or any combination thereof. In the illustrative embodiment, content editor 360 organizes the media and advertising content in a table.

In use, content editor 360 receives a portion of advertising content selected by a user from client device 310. Content editor 360 also receives a selection from the user for a particular media content from client device 310. Based on the portion and media content, content editor 360 organizes the media and advertising content. Content editor 360 identifies and extracts the media content selected by the user from media content unit 340. Content editor 360 then identifies and selects the appropriate advertising content from advertising content unit 350. The appropriate advertising content is the advertisements that are assigned to a media content based on the portion selected by the user. The appropriate advertising content can be identified by the provider based on the designated portion or can be randomly identified using an algorithm that includes a random number generator. Content editor 360 then inserts the advertising content into the appropriate advertisement spots in the media content to form a modified media content. Content editor 360 then presents modified media content to the user on client device 310.

The illustrative embodiments are not limited to the illustrated example. For example, data processing system 320 can include more or fewer components. Additionally, client device 310 can connect directly to or wirelessly to data processing system 320. Furthermore, components in data processing system 320 can be implemented as a completely hardware embodiment, a completely software embodiment, or a combination of hardware and software components.

Figure 4:
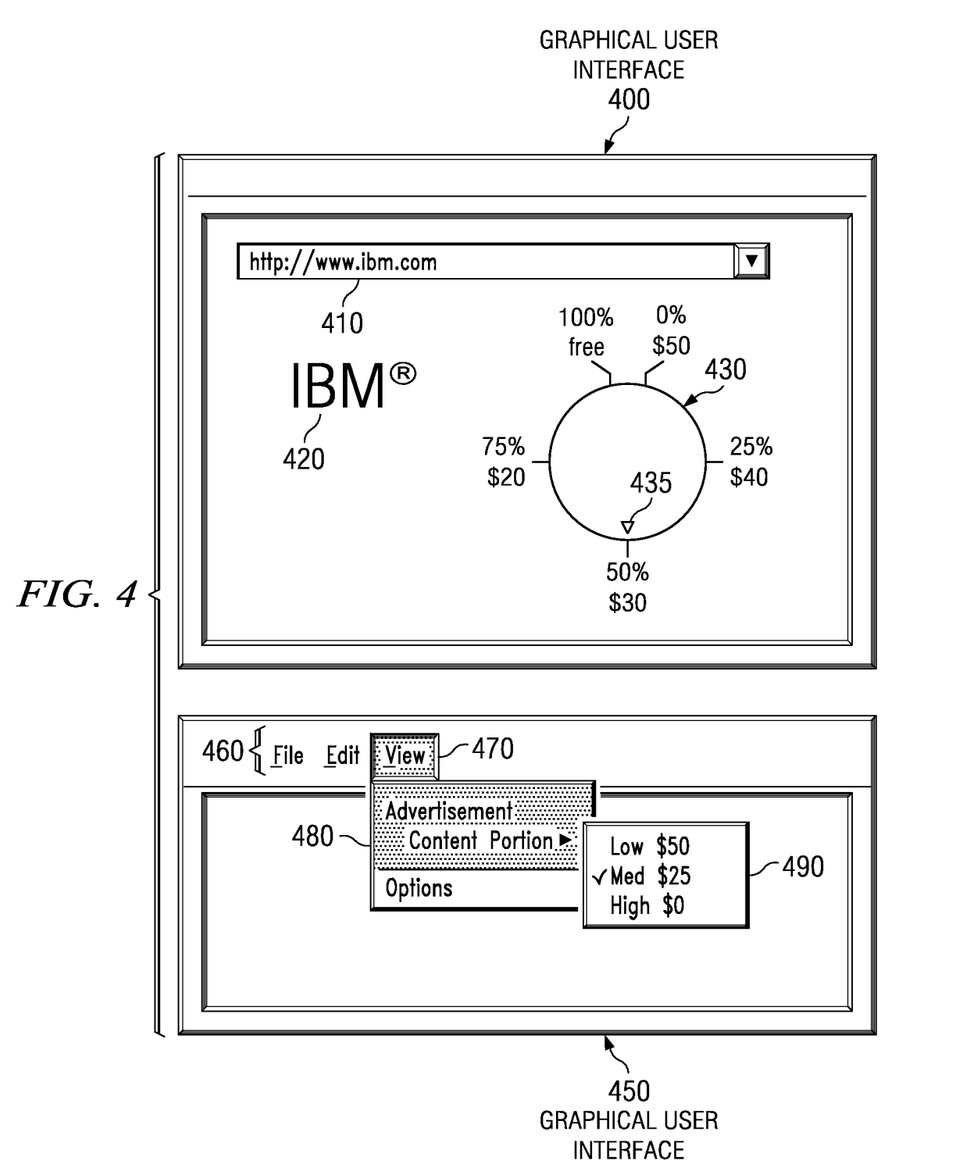
FIG. 4 illustrates two examples of how a user can select a portion of advertisement content, in accordance with an illustrative embodiment.

FIG. 4 illustrates two examples of how a user can select a portion of advertisement content, in accordance with an illustrative embodiment. Graphical user interfaces 400 and 450 can be implemented in a client device, similar to client device 310 of FIG. 3. Graphical user interfaces 400 and 450 are separate instances of a browser, typically displayed in a networked data processing system, similar to clients 110, 112, and 114 of FIG. 1, data processing system 200 of FIG. 2, or data processing system 320 of FIG. 3.

In the illustrative embodiment, graphical user interface 400 provides a graphical control in the form of a dial for a user to select a desired amount of advertisement content. Graphical user interface 400 includes address window 410, website content 420, and dial 430. Address window 410 indicates the URL or internet address for a particular website. In the illustrative embodiment, address window 410 displays the URL "http://www.ibm.com". In the illustrative embodiment, website content 420 is the media content the user has selected. In the illustrative embodiment, website content 420 illustrates the IBM logo as the content for "http://www.ibm.com".

Dial 430 is the graphical control that allows a user to select the amount of advertising content viewed by the user. In the illustrative embodiment, dial 430 has 0%, 25%, 50%, 75%, and 100% indicators. The indicators indicate the amount of advertising that will be viewed by a user on graphical user interface 400. In the illustrative embodiment, no advertising content will be displayed if the 0% indicator is selected, while all advertising content will be displayed if the 100% indicator is selected. Any percentage in-between indicates a percentage of the total amount of advertising content. Thus, 25% of the maximum advertising content will be displayed if the 25% indicator is selected, and so on.

A price is illustrated next to each indicator. In the illustrative embodiment, the price for 0% of the advertising content is $50, the price for 25% of the advertising content is $40, the price for 50% of the advertising content is $30, the price for 75% of the advertising content is $20, and the price for 100% of the advertising content is free.

Arrow 435 on dial 430 shows which indicator or level a user selected. In the illustrative embodiment, arrow 435 is at the 50% indicator, which indicates that the user will view 50% of the total advertising content while viewing content in graphical user interface 400 for the cost of $30.

In the illustrative embodiment, dial 430 applies only to a single browser instance. In other words, a user can select another advertising content portion when the user opens another instance of a browser. In another embodiment, dial 430 can apply to all browser instances opened by the user. In yet another embodiment, dial 430 can apply to a single website or URL viewed by the user in graphical user interface 400. Thus, a user can choose a different advertising content portion when the user views another website.

Furthermore, in yet another embodiment, a user can dynamically change the advertising content portion indicated on dial 430. Users may dynamically change to a different portion if the user is not satisfied with the amount of advertising content viewed by the user. In certain circumstances, a user may want to view more or less advertising content. In other circumstances, the user may want to reduce or increase the amount of money spent by the user while viewing graphical user interface 400. Therefore, in the illustrative embodiment, a user can select different advertising content portions at any interval. For example, a user can select a different advertising content portion after viewing three websites, and then select another portion after viewing ten websites.

Graphical user interface 450 is similar to graphical user interface 400, except a user selects the advertising content portion using a drop down menu. Graphical user interface 450 includes menu bar 460. Menu bar 460 has three menu options: File, Edit, and View 470. In the illustrative embodiment, the different advertisement content portions are included in view menu 470. View menu 470 has two options: advertisement content portion 480 and options. Advertisement content portion 480 further includes submenu 490. Submenu 490 indicates three advertising content portions: low, med, and high. In the illustrative embodiment, the low level means that the lowest number of advertisements will be displayed on graphical user interface 450. The high level means that all advertisements will be displayed on graphical user interface 450. In the illustrative embodiment, a price is listed next to each level of advertising content. The price for the low level is $50, the price for the med level is $25, and the price for the high level is $0.

In the illustrative embodiment, the user selected the med level, which is indicated by the "✓" symbol. In other words, in the illustrative embodiment, a user selected to receive a medium amount of advertising content while using graphical user interface 450 at a cost of $25.

As in graphical user interface 400, advertising content portion 480 applies only to a single browser instance. However, in other embodiments, advertising content portion 480 may apply to all browser instances or may be limited to only a single website. In an alternative embodiment, a user can dynamically change advertising content portion 480 at any interval.

The illustrative embodiments are not limited to depicted examples. For example, graphical user interfaces 400 and 450 can include more or fewer features. Additionally, graphical user interfaces 400 and 450 can have dial 430 or advertisement content portion 480 located in a different position. Furthermore, dial 430 and advertisement content portion 480 may be graphically illustrated in a different form. For example, dial 430 may be illustrated as a thermometer, a slider, a scale, a list, or a meter. Furthermore, a user is not limited to selecting a portion of advertisement through graphical user interfaces 400 and 450. For example, a user can select the portion in a written letter or by using a registration form.

Figure 5:
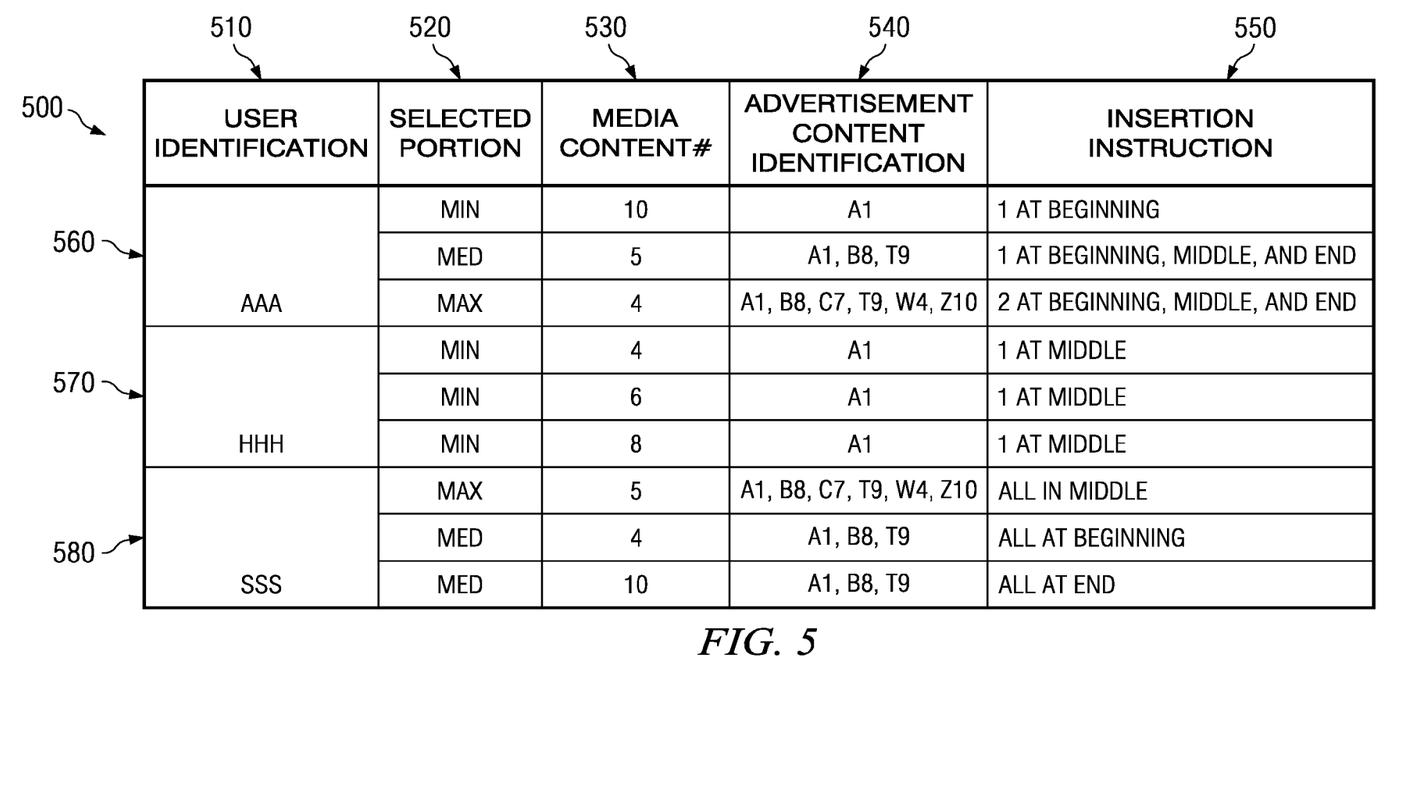
FIG. 5 illustrates an example table for managing advertising content, in accordance with an illustrative embodiment.

FIG. 5 illustrates an example table for managing advertising content, in accordance with an illustrative embodiment. Table 500 can be implemented in a content editor, such as content editor 360 of FIG. 3. Table 500 includes user identification column 510, selected portion column 520, media content # column 530, advertisement content identification column 540, and insertion instruction column 550.

User identification column 500 is a list of users subscribing to the service provided by the media content provider. In the illustrative embodiment, user identification column 500 includes three users: user "AAA" in row 560, user "HHH" in row 570, and user "SSS" in row 580.

Selected portion column 520 is the portion of advertising content selected by the user in user identification column 510. In the illustrative embodiment, the provider of the media content provides three different levels: "min", "med", and "max". In the illustrative embodiment, the "min" level indicates that a minimum amount of advertising content will be displayed to the user. Specifically, the provider will show only one advertisement per media segment or program to the user. The "med" level indicates a medium amount of advertising content, and, specifically, the provider will show three advertisements per media segment. The "max" level indicates a maximum amount of advertising content, and, specifically, the provider will show six advertisements per media segment.

In the illustrative embodiment, a user has the option of selecting a different portion for each media segment. In the illustrative embodiment, user "AAA" in row 560 selected a different portion for each media segment. On the other hand, user "HHH" in row 570 selected the same portion, "min," for each media segment, while user "SSS" in row 580 selected one portion for one media segment and another portion for the other two media segments.

Media content # column 530 lists the media segment selected by the user in user identification column 510. In the illustrative embodiment, the media segment is identified by number. However, in another embodiment, the provider of the media service can list the media segments by name or other identification methods.

In the illustrative embodiment, user "AAA" selected media content numbers "10", "5", and "4" with a selected portion of "min", "med", and "max", respectively. User "HHH" selected media content numbers "4", "6", and "8" with a selected portion of "min" for all the media segments. User "SSS" selected media content numbers "5", "4", and "10" with a selected portion of "max", "med", and "med", respectively.

Advertisement content identification column 540 lists the advertisements designated to be shown for a particular media segment based on the portion selected by the user. In the illustrative embodiment, the determination of which advertisement is to be shown is based solely on the selected portion indicated in selected portion column 520. However, in another embodiment, the determination of which advertisement is to be shown is based on the media segment that is to be shown. In yet another embodiment, the determination is based on the profile of the user.

In the illustrative embodiment, the advertisement content does not change based on the media content number. In other words, the same advertisements are shown for a particular portion, and do not change with the media segment, time of day, or type of media segment. Thus, in the illustrative embodiment, a "min" level shows advertisement content identification number A1. A "med" level shows advertisement content identification numbers A1, B8, and T9. A "max" level shows advertisement content identification numbers A1, B8, C7, T9, W4, and Z10.

Insertion instruction column 550 lists the command for when an advertisement is to be inserted into the media content. In the illustrative embodiment, the advertisement content is inserted at the beginning, middle and end of the media segment. Additionally, in the illustrative embodiment, the advertisement content is inserted evenly and in advertisement blocks. Thus, in the illustrative embodiment, at the "min" level, one advertisement is presented at the beginning of the media segment. At the "med" level, one advertisement is presented at each of the beginning, the middle, and the end of the media segment. For the "max" level, advertisements are presented in three blocks: beginning, middle, and end. Two advertisements are shown in each block.

In the illustrative embodiment, the order of advertisements is not determined. Therefore, the provider of media content for the illustrative embodiment can show the advertisement content in advertisement content identification column 540 in any order. The order is not limited to a particular media segment and can vary from media segment to media segment.

The illustrative embodiment is not limited to the depicted example. For example, more or fewer users can be listed and more or fewer media segments can be identified for each user. Additionally, the order of the advertisements can be limited by the provider. Furthermore, the insertion instructions can also be organized differently. Moreover, the advertisements may be statistically integrated into the media content and not predetermined. Thus, an algorithm, such as a random number generator, may be used to select which advertisements to insert and when to insert the advertisements.

Figure 6:
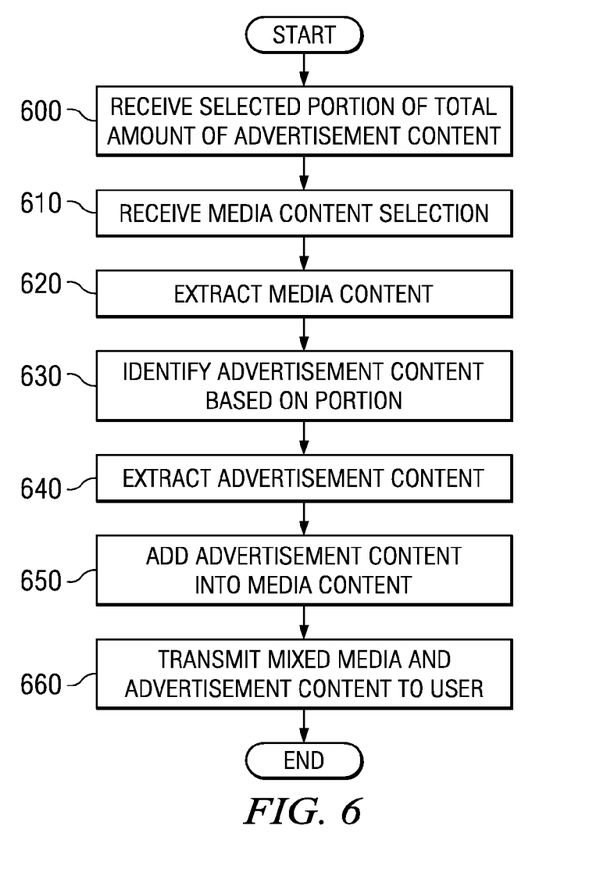
FIG. 6 illustrates a flowchart for managing advertising content, in accordance with an illustrative embodiment.

FIG. 6 illustrates a flowchart for managing advertising content, in accordance with an illustrative embodiment. The following process is exemplary only and the order of the steps may be interchanged without deviating from the scope of the invention. The process is executed in a content editor, similar to content editor 360 of FIG. 3.

The process begins with the content editor receiving a selected portion of the total amount of advertisement content from a user (step 600). The portion indicates the amount of advertising content the user selected to receive. The portion can be one or more levels of advertisement content. The content editor then receives a media content selection from the user (step 610). The media content selection is the media segment which the user has selected to listen to or to view. The content editor then extracts the media content from the media content unit (step 620). The content editor identifies the advertisement content based on the portion selected by the user (step 630). The content editor then extracts the appropriate amount of advertisement content from the advertising content unit (step 640). The content editor then adds or inserts the advertisement content into the media content (step 650). The location of the advertisement content in the media content is dependent on the portion selected by the user. The location is also dependent upon the way the provider of the media content defined the portions. The content editor then transmits the mixed media and advertisement content to the user (step 660), with the process terminating thereafter.

Thus, the illustrative embodiments provide a computer implemented method, an apparatus, and a computer usable program product for varying the amount of advertising content broadcast to a user in exchange for varying the cost incurred by the user. A content editor provides a portion of a plurality of levels of advertising to a user. The portion indicates an amount of advertising content to be received by the user. A price is associated with the portion of the plurality of levels. The price varies with the portion, and the price is presented to the user as the user selects the portion of the plurality of levels.

A user can select the portion of the plurality of levels using a graphical control displayed on a user interface. The graphical control can be at least one of a dial, a slider, or a list. The user can select the portion prior to or as the media content is being presented to the user. In response to the user selecting the portion of the plurality of levels, the content editor inserts the amount of advertising content into a media content to form a modified media content. The amount of advertising content inserted corresponds to the portion of the plurality of levels selected by the user. The content editor then transmits the modified media content to the user.

A media content provider provides the plurality of levels. The media content provider can be a broadcast media provider, such as a television or radio broadcast provider. The media content provider can also be an internet-based media provider, such as a website.

The illustrative embodiments allow a user to choose between a variety of pricing packages. The illustrative embodiments allow a user to select a percentage of reduction in the amount of advertising content and are not limited to only two options. The illustrative embodiments also apply to other media broadcast providers, including but not limited to television and radio station providers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for varying the amount of received advertising content, the method comprising:
    providing a portion of a plurality of levels of advertising to a user, wherein the portion of the plurality of levels indicates an amount of advertising content to be received by the user;
    responsive to receiving a user input selecting the portion of the plurality of levels, inserting, by the computer, the amount of advertising content into a media content to form a modified media content, wherein the amount of advertising content corresponds to the portion of the plurality of levels selected by the user, wherein the user dynamically selects the portion of the plurality of levels as the media content is transmitted to the user, and wherein the advertising content is prorated, by the computer, based on the amount of time remaining within the media segment when the portion of the plurality of levels is dynamically selected; and
    transmitting the modified media content to the user.

2. The computer implemented method of claim 1,
    wherein a media content provider provides the modified media content, and
    wherein the media content provider is at least one of a broadcast media content provider or an internet-based media content provider.

3. The computer implemented method of claim 1, further comprising:
    providing a graphical control for the user to select the portion of the plurality of levels.

4. The computer implemented method of claim 3,
    wherein the graphical control is at least one of a dial, a slider, a list, a scale, and a thermometer.

5. The computer implemented method of claim 1, further comprising:
    attributing a price to the portion of the plurality of levels, wherein the price is presented to the user as the user selects the portion of the plurality of levels.

6. A system comprising:
    a user interface that allows a user to select a portion of a plurality of levels of advertising, wherein the portion of the plurality of levels indicates the amount of advertising content to be presented to the user;
    a data processing system coupled to the user interface, wherein the data processing system provides the portion of the plurality of levels to the user on the user interface; and
    a content editor that inserts the amount of advertising content into a media content to form a modified media content, wherein the amount of advertising content corresponds to the portion of the plurality of levels selected by the user, wherein the content editor transmits the modified media content to the user, and wherein the user dynamically selects the portion of the plurality of levels as the media content is transmitted to the user, and wherein the advertising content is prorated based on the amount of time remaining within the media segment when the portion of the plurality of levels is dynamically selected.

7. The system of claim 6, wherein the data processing system further comprises:
    an advertising content unit coupled to the content editor, wherein the advertising content unit stores the amount of advertising content; and
    a media content unit coupled to the content editor, wherein the media content unit stores media content provided to the user.

8. The system of claim 6 wherein the data processing system further comprises:
    an advertising levels unit coupled to the user interface, wherein the advertising levels unit presents the plurality of levels to the user, and wherein the advertising levels unit attributes a price to the portion of the plurality of levels, and wherein the price is presented to the user as the user selects the portion of the plurality of levels.

9. The system of claim 6,
    wherein a media content provider provides the modified media content, and
    wherein the media content provider is at least one of a broadcast media content provider or an internet-based media content provider.

10. The system of claim 6,
wherein the user interface comprises a graphical control.

11. The system of claim 10,
wherein the user selects the portion of the plurality of levels using the graphical control, and
wherein the graphical control is at least one of a dial, a slider, a list, a scale, and a thermometer.

12. A non-transitory computer storage type media having a computer program product encoded thereon, the computer program product including computer usable program code for varying the amount of received advertising content, the computer program product comprising:
   computer usable program code for providing a portion of a plurality of levels of advertising to a user, wherein the portion of the plurality of levels indicates an amount of advertising content to be received by the user, wherein the user dynamically selects the portion of the plurality of levels as the media content is transmitted to the user, wherein the advertising content is prorated based on the amount of time remaining within the media segment when the portion of the plurality of levels is dynamically selected;
   responsive to receiving a user input selecting the portion of the plurality of levels, computer usable program code for inserting an amount of advertising content into a media content to form a modified media content, wherein the amount of advertising content corresponds to the portion of the plurality of levels selected by the user; and
   computer usable program code for transmitting the modified media content to the user.

13. The non-transitory computer storage type media of claim 12,
wherein a media content provider provides the modified media content, and
wherein the media content provider is at least one of a broadcast media content provider or an internet-based media content provider.

14. The non-transitory computer storage type media of claim 12, further comprising:
   computer program code for providing a graphical control for the user to select the portion of the plurality of levels.

15. The non-transitory computer storage type media of claim 14,
wherein the graphical control is at least one of a dial, a slider, a list, a scale, and a thermometer.

16. The non-transitory computer storage type media of claim 12, further comprising:
   computer program code for attributing a price to the portion of the plurality of levels, wherein the price is presented to the user as the user selects the portion of the plurality of levels.

* * * * *